Nov. 20, 1951  A. J. SCHENK  2,575,396
TROLLEY PROPELLING DEVICE FOR CONVEYER SYSTEMS
Filed Nov. 24, 1948  3 Sheets-Sheet 2
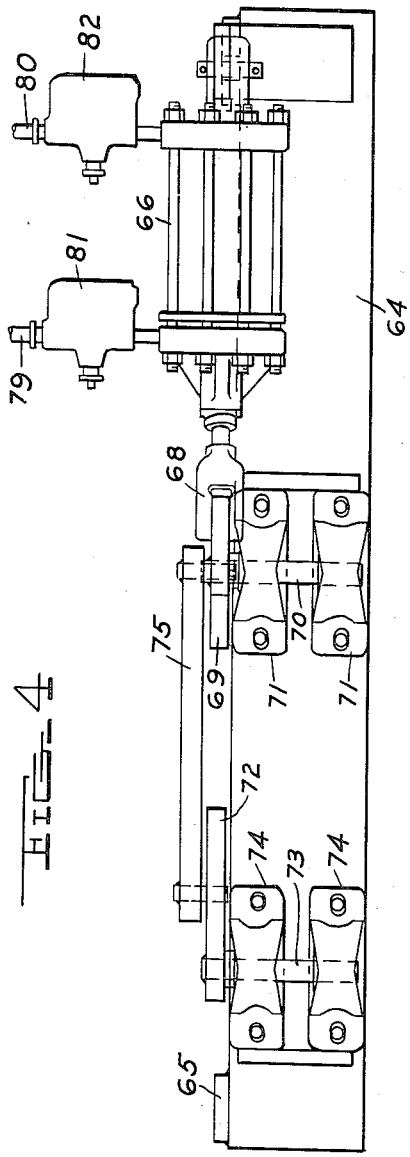
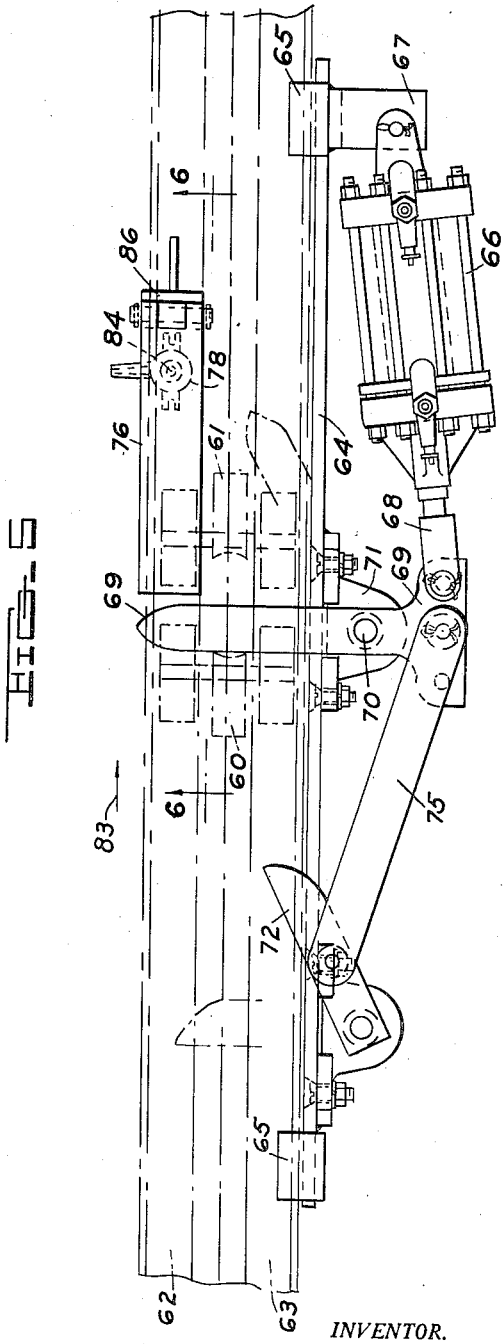
INVENTOR.
ADELBERT J. SCHENK
BY
Farley Forster + Farley
ATTORNEYS

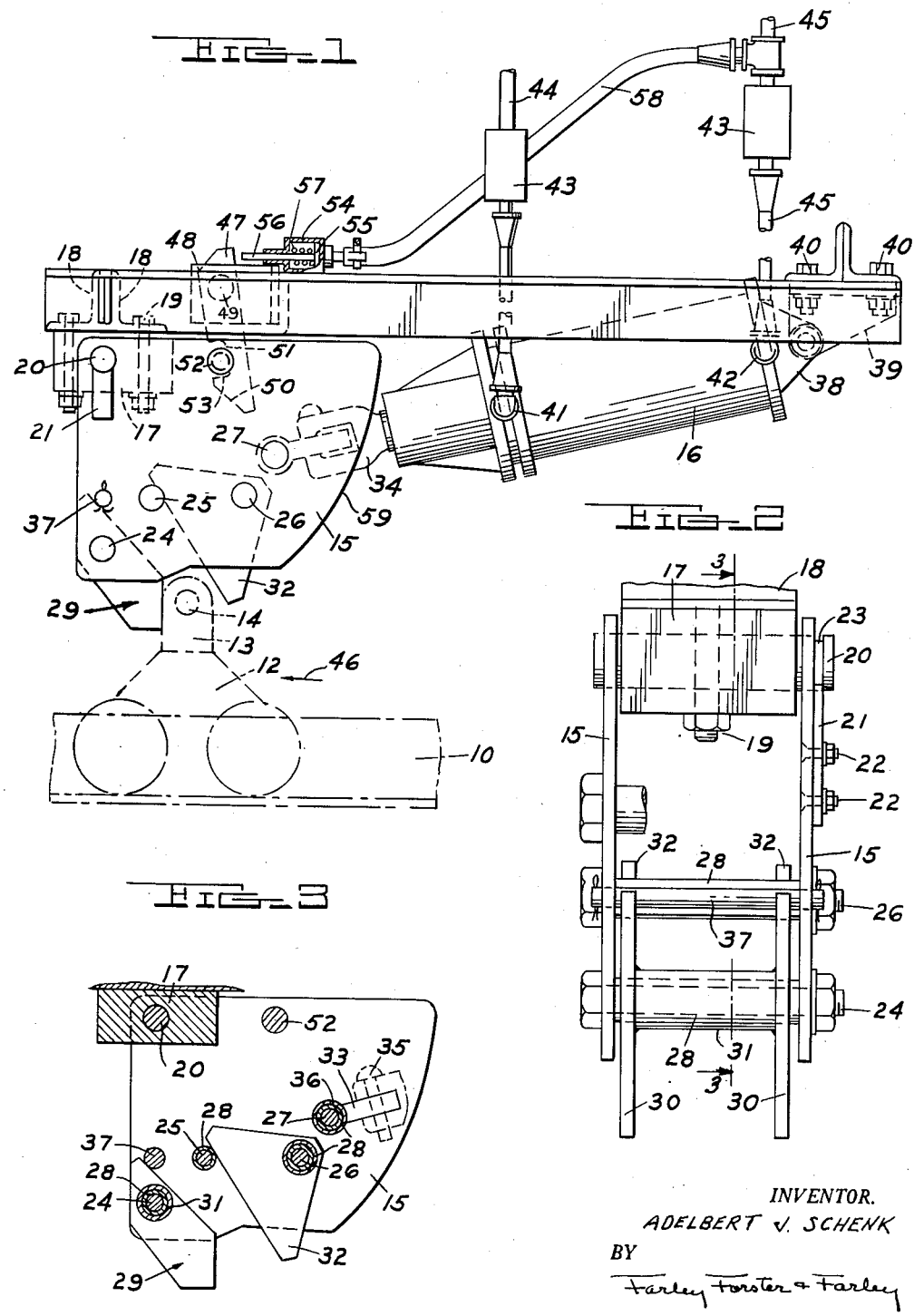

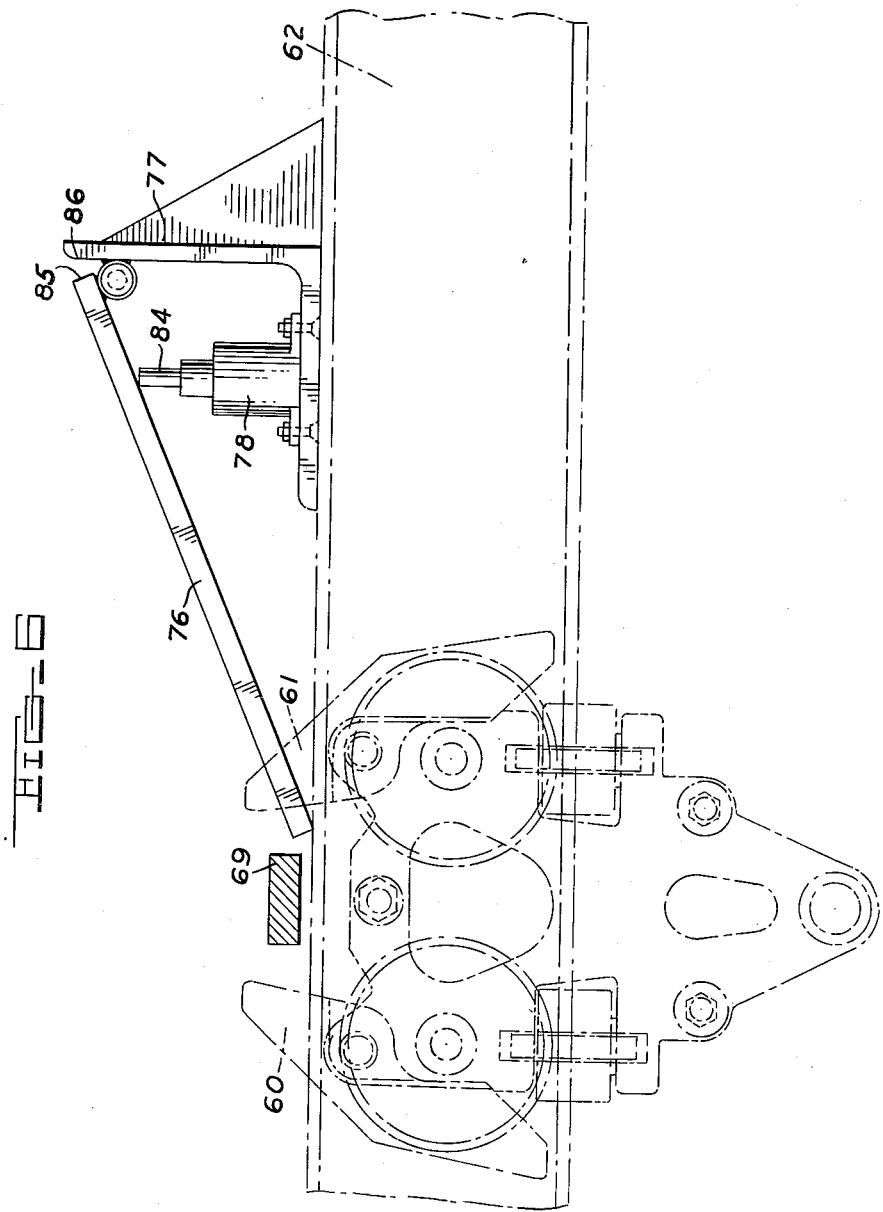

Patented Nov. 20, 1951

2,575,396

UNITED STATES PATENT OFFICE 2,575,396

TROLLEY PROPELLING DEVICE FOR CONVEYER SYSTEMS

Adelbert J. Schenk, Huntington Woods, Mich., assignor to Jervis B. Webb Company, Detroit, Mich., a corporation of Michigan Application November 24, 1948, Serial No. 61,856

20 Claims. (Cl. 104—162)

This invention relates to devices to propel and regulate the movement of a wheeled carrier along a conveyor track of the type where a chain or other conventional means of propulsion is not used.

In the conveyor field, a type of installation is becoming increasingly popular wherein wheeled article-supporting trolleys are either pushed along a separate track by a main conveyor line of the conventional chain and trolley type, or carried thereby. At stations along this line the wheeled article-supporting trolleys can be diverted from the path of the main conveyor onto branch lines where they are propelled by hand, by gravity or by an auxiliary conveyor. The devices of the present invention are designed to control the passage of these trolleys along branch lines of this type, to advance the article-carrying trolley from work station to work station along such branch line, or to feed the trolley from the branch line back into the path of the main conveyor.

Conveyor systems of this type are illustrated in the patents to J. B. Webb, et al., Nos. 1,875,966 and 1,921,109. In the first of these patents the main conveyor is equipped with hooks which engage the load-carrying trolleys so that these trolleys are carried by the main conveyor from one branch line location to another. At each branch line location the load-carrying trolley is deposited upon its own supporting tracks and can be disengaged from the hook of the main conveyor for independent travel along its branch line. In the second of these patents a separate supporting track is provided along the length of the main conveyor. The article-carrying trolleys travel along this separate track pushed by a member carried by the main conveyor and at branch line locations a switch can be thrown to divert the article-carrying trolley from the main track onto a branch line. If desired, the pusher and hook type of main line propulsion can be combined in a single system, but regardless of whether such a combination is made, the problems connected with the travel of the article-carrying trolleys along the branch lines and in the feeding of such trolleys back into the path of the main line conveyor remain the same.

For feeding, it has been found that on any branch line some positive means of feeding the article-carrying trolley back into the path of the main conveyor is necessary because the arrival of this trolley in the path of the main conveyor must be synchronized with the simultaneous arrival of an empty hook or pusher. Gravity feeding means have not been successful because of differences in inertia with varying loads and also because of differences in rolling friction between article-carrying trolleys. The use of an auxiliary type of conveyor for branch line operation adds greatly to the cost of an installation and also presents problems in synchronization of the rate of travel of such auxiliary conveyor with that of the main line conveyor. Furthermore, an auxiliary conveyor does not afford the flexibility of branch line operation obtained with the devices of the present invention.

For travel on any branch line where a number of stations are used and where a number of article-carrying trolleys may be located on the line at the same time it has been found necessary to provide some positive means for propelling and regulating the travel of the trolleys along the branch line. Gravity alone is not successful and here again the use of auxiliary propelling conveyors adds too much to the cost of an installation.

The present invention contemplates the use of gravity in combination with an intermittent propelling device which will have certain features necessary for proper operation of the conveyor under all conceivable conditions and which is also susceptible of being controlled manually or automatically according to the complexity of the system. The objects of the invention may be expressed in terms of the principal features of the device and include the provision of a device which will:

1. Bring each trolley engaging the device to a cushioned stop;

2. Hold each trolley stopped against movement in either direction until the device is actuated;

3. Provide positive means preventing movement of the device while the conveyor system is shut down;

4. Provide controlled propulsion of the trolley when the device is actuated;

5. Prevent a following trolley from passing through the device during actuation;

6. Be installed in any number and at any point along the conveyor track; and

7. Be extremely simple in construction and operation and whose operation can readily be controlled according to the requirements of the conveyor system.

In the drawings accompanying this specification, two forms of the device are shown, one being designed for use with trolleys of a system using carrying hooks on the main line and the other being for use with trolleys of a system where pusher members are used on the main line.

Figs. 1 to 3 show the first type of device while the second type is shown in Figs. 4 to 6. These various figures of the drawings may be briefly described as follows:

Fig. 1 is a side elevation of a device for use with hook type trolleys and includes in phantom a portion of a conveyor track and trolley mounted thereon, such trolley being shown in engagement with the device;

Fig. 2 is an end elevation of the device not including the actuating cylinder and supporting framework;

Fig. 3 is a section on a smaller scale taken along the line 3—3 of Fig. 2;

Fig. 4 is a side elevation of a device for use with pusher type trolleys;

Fig. 5 is a plan view of the device shown in Fig. 4 including a section of conveyor track, a trolley carried thereby in engagement with the device, a latch member forming part of the device, and the general relation between the track, trolley and operating parts of the device; while Fig. 6 is an enlarged view in elevation taken along the line 6—6 of Fig. 5 and including a pusher type trolley, a section of track, and the latch mechanism of the device of Figs. 4 and 5.

Referring first to Figs. 1 to 3, a conveyor track 10, which in this case consists of a pair of opposed angles, is supported from a suitable overhead framework by a plurality of hangers 11. Preferably, this track is installed with a slight pitch in the direction of travel which is from right to left in Fig. 1. A four wheeled trolley 12 rides upon the track 10, this trolley having been referred to as a hook type since its structure includes an upwardly projecting tongue member 13 through which is mounted a crossbar 14 for engagement by hooks carried by the main line conveyor of the system.

The device consists essentially of a pair of pivotally mounted plates 15 actuated by an air cylinder 16. At the pivotal axis of the plates a mounting block 17 is used to space the upper ends of the plates, to connect the assembly to the supporting frame members 18 by bolts 19, and to provide a supporting member for a pivot pin 20 which extends through a hole drilled in the body of the block 17 and projects outwardly therefrom to engage the plates 15. A keeper bar 21, shown in Fig. 2, is attached by bolts 22 to the right hand plate 15 and engages a slot 23 in the pivot pin 20 to retain the plate assembly in position. The pair of plates 15 are also joined by four bolts, shown clearly in the side elevation of Fig. 1, and which for convenience are referred to from left to right by the reference numerals 24, 25, 26 and 27. Each of these bolts carries a spacer member 28 to fix the distance between the plates 15 and to hold them securely in position. The first of these bolts 24 also serves as a mounting for a pivoted dog 29, this dog being composed of a pair of plates 30, shown in Fig. 2, joined to an intermediate length of tubing 31. The third bolt 26 acts as a pivotal connection for a second dog 32 identical in construction to the dog 29 except for the shape of its plates. The second bolt 25 with its surrounding spacer 28 acts as a stop to limit rotation of the dog 32 in a counterclockwise direction. The fourth bolt 27 acts as a mounting for a clevis tongue 33 to which the piston rod 34 of the actuating cylinder is attached by a pin 35. This clevis tongue is attached to a length of tubing 36 which freely fits over the spacer 28 carried by the bolt 27 to provide a pivotal attachment between the plate assembly and the piston rod of the actuating cylinder. A pin 37 also extends between the plates 15 at a location just above the position of the bolt 24 so that this pin 37 acts as a stop to limit pivotal movement of the dog 29 in a clockwise direction.

Mounting of the head end of the actuating cylinder, which is provided with a clevis type of attachment fixture 38, is made to the frame structure through a bracket 39 attached to such structure by bolts 40. The cylinder 16 shown is of the air actuated type and is equipped with two ports, one designated 41 adjacent the rod end of the cylinder, and the second 42 adjacent the head end of the cylinder. A flow control valve 43 is included in each of the supply lines 44 and 45 to the rod and head ends of the cylinder, respectively. These supply lines are connected to a suitable control valve, not shown, but which is one of the so-called four-way types commercially available and whose operation will cause either of the lines 44 or 45 to become pressure or exhaust lines. Except during actuation of the device the line 44 is connected to air pressure and the line 45 is the exhaust line, thus holding the piston of the actuating cylinder in the retracted position shown.

With the device in this position the crossbar 14 of a trolley traveling along the track 10 in the direction of the arrow 46 will first contact the dog 32 to cause a rotation of the dog 32 in a clockwise direction. The amount of this rotation is limited by the position of the bolt 27 so that the dog 32 cannot be rotated so far out of the position shown that it will not return thereto by gravity after the trolley has passed. As the trolley proceeds onward its crossbar 14 next contacts the dog 29 which, being held against clockwise rotation by the pin 37, acts as a stop and brings the trolley to rest with its crossbar trapped between the two dogs. The arresting action to motion of the trolley produced by the dog 29 tends to cause rotation of the plates 15 about the pivot pin 20 and since this rotative movement of the plates is opposed by the air pressure supplied through the line 44 to the rod end of the cylinder, the momentum of the trolley and any load carried thereby is absorbed within the cylinder, thus giving a cushioned stop.

As mentioned early in this specification, one of the desirable functions of a device of this type is to positively locate a trolley at a fixed position in the conveyor system until such time as a device is actuated. This object is attained principally through the provision of the double dogs 29 and 32 between which the trolley is trapped as soon as it engages the device. However, if the momentum of the trolley and its load were great enough to overcome the air pressure in the cylinder, or if while the trolley were trapped in the position shown the air pressure were removed, such as likely to happen when the conveyor is shut down overnight, the trolley, being urged in the normal direction of travel by gravity, could conceivably cause rotation of the plates 15 in a clockwise direction and thus escape from between the two dogs. To positively prevent such overpowering of the device or accidental release thereof, a latch is provided which consists simply of a latch bar 47 pivotally attached to a supporting bracket 48 on the overhead framework by a pivot pin 49 and having a cam surface 50 and an elongated notch 51, either of which engage a latch pin 52 carried between the side plates 15. The notch 51 is dimensioned so that with the device in its fully retracted position shown some clearance exists between the lower end 53 of the notch and the surface of the latch pin 52 so that the latch will not interfere with the cushioning action of the device in stopping a trolley, as previously described. An automatic latch release mechanism is included consisting simply of a small air cylinder 54 containing a piston 55 and rod 56 which are normally urged toward the head end of the cylinder by a spring 57. This assembly is mounted on the framework as shown so that with the piston 55 adjacent the head end of the cylinder, the outer end of the rod 56 lies adjacent to the edge of the latch bar 47. The cylinder 54 is connected by an air line 58 to the line 45 leading to the head end of the main actuating cylinder 16. When air is supplied through line 45 to the head end of the cylinder to actuate the device, a portion of this air, since flow through the line 44 is restricted by the valve 43, will first flow through line 58 forcing the piston 55 to the opposite end of the cylinder 54 and producing counterclockwise rotation of the latch bar 47 through its engagement by the rod 56. The latch bar will be held in retracted or inoperative position as long as air pressure is supplied through the line 45.

To further follow the actuation which takes place when air pressure is supplied to the line 45, as air pressure builds up in the actuating cylinder 16, its rod 34 will move to the left thus causing a clockwise rotation of the plates 15 about their pivot pin 20. This rotation will cause the dog 32 to engage the crossbar 14 on the trolley and further pivotal movement of the plates 15 will lift the other dog 29 up out of the path of travel of the trolley. Actuating movement of the piston rod 34 produces substantially 45 degrees of rotation of the plates 15.

The device is designed to impart motion to but one trolley at a time, this being accomplished by the action of the arcuate edge 59 of the plates 15 and also by the length of the upper straight edge of such plates from the center of the pivot pin 20. Thus, during actuation of the device the arcuate edges 59 of the plates 15 will exert a wedging action against the crossbar of any following trolley to bring it to a stop, and when the direction of motion of the plate is reversed, the arcuate edges thereof will be withdrawn from engagement with the following trolley crossbar without the necessity of moving such trolley rearwardly.

When air pressure is supplied through line 44 and line 45 is connected to exhaust to return the device to normal position, the latch release cylinder 54 is also exhausted and its piston 55 is returned to the position shown in Figs. 1 and 3.

As mentioned before, feeding devices of this type are generally employed in combination with a pitched conveyor track so that gravity is always urging the trolleys in the normal direction of travel. Thus, if any trolley has been held up by the device while it was in actuated position, such trolley will be free to proceed forward, as soon as the plates have been retracted to inoperative position, and become engaged between the dogs 29 and 32. The dog 29 is mounted for free rotation in a counterclockwise direction so that any trolley which has proceeded past the station defined by the location of the device can be returned into engagement with the device should it for any reason be desirable to do so.

The form of the device illustrated in Figs. 4 to 6, while differing somewhat in construction and appearance from that just described, offers the same mode of operation and the same advantages as the structure of Figs. 1 to 3. The difference in construction between the two forms of device is due entirely to the fact that they are designed to be used with different type trolleys. A pusher type trolley, such as is used with the second form of device, is illustrated clearly in Fig. 6 and in place of the tongue and crossbar used on the trolley shown in Fig. 1 it carries a pair of pivoted dogs 60 and 61, each of these dogs being mounted so that their tops are freely rotatable towards the center of the trolley bracket. Thus, the dog 60 is freely rotatable in a clockwise direction while the dog 61 is freely rotatable in a counterclockwise direction. By reason of this mounting of the dogs, any pusher member with which the dogs come into contact will be trapped between them regardless of the direction of relative movement between the trolley and the pusher member.

The conveyor track shown in Fig. 5 consists of a pair of opposed channels 62 and 63 and the feeding device illustrated is built around a base plate 64 which is placed against the vertical web of the channel 63 and located in position with the aid of two small horizontal plates 65. An air cylinder 66 is mounted to an angle bracket 67 extending from the side of the base plate and the rod 68 of this cylinder is pivotally attached to a pusher member 69 which in turn is mounted upon a vertical shaft 70 carried by two bearing blocks 71 bolted to the base plate 64. A stop bar 72 is similarly mounted upon a shaft 73 carried by a second pair of brackets 74 also bolted to the base plate 64 and this stop bar is connected by an actuating link 75 to the pusher bar 69.

In this construction, a latch similar in function and operation to the latch bar 47 used in the construction shown in Fig. 1 is also employed. This latch appears in the plan view of Fig. 5 and is shown in greater detail in the elevation of Fig. 6. It consists of a latch bar 76 pivotally attached to an angle bracket 77 which is positioned upon the upper horizontal flange of the channel track member 62. A spring return type of air-operated cylinder 78 is also attached to the angle bracket 77, this cylinder being similar in all respects to the cylinder 54 previously described.

The supply lines 79 and 80 to the rod and head ends of the cylinder 66 are also similar in all respects to the air supply system previously described in connection with the actuating cylinder 16. Flow control valves 81 and 82 are used in each of these lines and the spring return air cylinder 78 is connected into the line 80 at a point in advance of the control valve 82.

The device is shown in Fig. 5 in inoperative or blocking position with the pusher bar 69 extending substantially at right angles to the direction of travel of the trolley, as indicated by the arrow 83, and in this position of the pusher bar 69 the stop bar 72 is retracted to a position where it does not interfere with the travel of a trolley along the track. Thus, a trolley approaching the device will engage the pusher bar 69 which will then become trapped between the trolley dogs 60 and 61, as shown in Fig. 6. As was the case with the device previously described, air pressure to the rod end of the cylinder 66 acts as a cushion to absorb the momentum of the trolley and its load during this engagement of the pusher bar 69 between the trolley dogs. The latch bar 76 positively prevents the pusher bar from being overpowered by the trolley and prevents movement of the pusher bar in the normal direction of travel in case air pressure to the rod end of the cylinder 66 should be released.

When it is desird to impart further motion to the trolley by actuation of the device, air pressure is supplied through the line 80 to the head end of the cylinder, and, as was the case before, this pressure causes an immediate operation of the spring return cylinder 78 producing an upward movement of its rod 84 which lifts the latch bar 76 out of the path of travel of the pusher bar 69. This upward movement of the latch bar, however, is limited by the engagement which will take place between the end 85 of the latch bar and the adjacent face 86 of the angle bracket 77. Outward movement of the rod 68 from within the actuating cylinder 66 will cause a clockwise rotation of the pusher bar 69. During this rotation the pusher bar will engage the dog 61 of the trolley imparting motion thereto until, when the pusher bar reaches approximately the position shown in phantom in Fig. 5, it will be withdrawn from engagement between the two trolley dogs 60 and 61. This movement of the pusher bar will be simultaneously accompanied by a counterclockwise rotation of the stop bar 72 which will reach an obstructing position across the path of travel of a following trolley and prevent such trolley from proceeding through the feeder station while the feeder is being actuated and before it has been returned to normal position. When air is supplied through line 79 to the rod end of the cylinder 66 to return the pusher bar 69 to normal position, the simultaneous clockwise rotation of the stop bar 72 will advance any trolley trapped by the stop bar into engagement with the pusher bar. The spacing of the pusher bar 69 and stop bar 72, or the distance between their respective pivot pins 70 and 73 longitudinally of the conveyor track, is such that with the minimum spacing between trolleys, as determined by the carriers supported thereby, a following trolley will stop in advance of the stop bar location when a trolley is held by engagement with the pusher bar. Also, in installations where the conveyor system is set up so that no more than one trolley will occupy a branch line at one time, the device can be simplified by eliminating the stop bar and its supporting and actuating parts.

Actually the device shown in Figs. 4 to 6 can be used with the hook type trolley of Fig. 1 This combination, however, does not result in the trolley being positively trapped at the feeding station and in automatic systems where the actuation of a feeder device is synchronized with the happening of some other event in the system, the operation is not entirely positive unless each trolley is trapped when it is engaged by a feeder device.

I claim:

1. In combination with a conveyor track, a pusher member pivotally mounted to overlie such track and engage a trolley supported thereby in at least one position of said pusher member, means for actuating said pusher member to produce movement of said trolley along said track, latch means normally opposing movement of said pusher member mounted adjacent thereto, and means whereby said latch means will be withdrawn from opposing position upon movement of said actuating means.

2. In combination with a conveyor track, a pusher member mounted to overlie such track and engage a trolley supported thereby, means for actuating said pusher member to produce movement of said trolley along said track, latch means normally opposing movement of said pusher member mounted adjacent thereto, means whereby said latch means will be withdrawn from opposing position upon movement of said actuating means, and a blocking member movable into the path of travel of a trolley on said conveyor track simultaneously with the actuating of said pusher member.

3. A device of the character described comprising a pivotally mounted pusher member, actuating means adapted to produce pivotal movement of said pusher member from a blocking position, a latch member mounted to oppose travel of said pusher member, and means for rendering said latch member inoperative upon movement of said actuating means.

4. A device of the character described comprising a pivotally mounted pusher member, actuating means adapted to produce pivotal movement of said pusher member, a latch member mounted to oppose travel of said pusher member, means for rendering said latch member inoperative upon movement of said actuating means, a pivotally mounted blocking member and means operatively connecting said blocking member to said actuating means whereby said blocking member will move in a direction opposite to said pusher member upon movement of said actuating means.

5. A device of the character described comprising a supporting framework, a pair of spaced plates pivotally attached thereto, a pair of dogs pivotally mounted between said plates, each of said dogs normally engaging a stop, said stops permitting normal pivotal movement of said dogs in opposite directions, an actuating cylinder supported from said framework, a pivotal connection between the rod of said cylinder and said pair of plates whereby movement of said rod will produce pivotal movement of said plates about their pivotal axis.

6. A device of the character described comprising a supporting framework, a pair of spaced plates pivotally attached thereto, a pair of dogs pivotally mounted between said plates, each of said dogs normally engaging a stop, said stops permitting normal pivotal movement of said dogs in opposite directions, an actuating cylinder supported from said framework, a pivotal connection between the rod of said cylinder and said pair of plates whereby movement of said rod will produce pivotal movement of said plates about their pivotal axis, a latch bar supported from said framework, a latch pin fixed to said plates and normally engaged by said latch bar, and means to disengage said latch bar simultaneously upon movement of said rod of said actuating cylinder.

7. A device of the character described comprising a supporting plate, a shaft carried thereby, a pusher member pivotally mounted upon said shaft, an actuating cylinder carried by said supporting plate and having its rod pivotally attached to said pusher member at a point spaced from said shaft, a latch bar mounted adjacent said pusher member to oppose pivotal movement of said pusher member in one direction, and means to withdraw said latch bar from opposing position upon energization of said actuating cylinder.

8. The combination of a conveyor track, a pusher member mounted to overlie said track, a trolley carried by said track, a pair of pivoted dogs carried by said trolley and adapted to engage said pusher member, means to actuate said pusher member to impart movement to said trolley and to withdraw said pusher member from engagement with said pivoted dogs during such actuation.

9. The combination set forth in claim 8 wherein said pair of pivoted dogs are carried by said pusher member and adapted to engage said trolley.

10. A device of the type described comprising a supporting framework, a pair of spaced plates pivotally mounted thereto, an actuating cylinder carried by said framework and having its rod attached to said plates, fluid supply lines leading to the head and rod ends of said actuating cylinder, a latch member carried by said framework and restricting pivotal movement of said plates in one position thereof, means to release said latch member comprising a fluid operated plunger mounted to engage said latch member, a pair of dogs pivotally mounted between said plates and projecting therefrom and a stop normally engaged by each of said dogs to restrict pivotal movement thereof to opposite directions.

11. A device of the type described comprising a supporting framework, a pusher member pivotally mounted thereon for movement from a blocking position, an actuating cylinder carried by said framework and having its rod attached to said pusher member, fluid supply lines leading to the head and rod ends of said actuating cylinder, a latch member adapted to be positioned to restrict pivotal movement of said pusher member from the blocking position thereof, and means to release said latch member comprising a fluid operated plunger mounted to engage said latch member.

12. A device of the type described comprising a supporting framework, a pusher member pivotally mounted thereon, an actuating cylinder carried by said framework and having its rod attached to said pusher member, fluid supply lines leading to the head and rod ends of said actuating cylinder, a latch member adapted to be positioned to restrict pivotal movement of said pusher member in one position thereof, means to release said latch member comprising a fluid operated plunger mounted to engage said latch member, a second pusher member pivotally mounted on said framework and a link connected to each of said pusher members to cause pivotal movement of said first pusher member to be accompanied by simultaneous and opposite rotation of said second pusher member.

13. For use with a conveyor track, a device for controlling movement of a trolley along such track comprising a pusher member pivotally mounted to overlie said track in at least one blocking position, means to engage said trolley with said pusher member to prevent movement of said trolley in either direction of travel along said track, and means for actuating said pusher member to produce movement of said trolley in a normal direction of travel.

14. The invention set forth in claim 13 wherein said means to engage a trolley with said pusher member comprises a pair of pivotally mounted dogs carried by said pusher member, each of said dogs normally engaging a stop to confine pivotal movement thereof to opposite directions.

15. The invention set forth in claim 13 further including latch means normally opposing movement of said pusher member mounted adjacent to said pusher member, and means whereby said latch means will be withdrawn from such opposing position upon movement of said actuating means.

16. The invention set forth in claim 13 wherein said actuating means comprises a fluid pressure device and further including latch means normally opposing movement of said pusher member mounted adjacent to such pusher member, and means whereby said latch means will be withdrawn from opposing position in response to the application of fluid pressure to said actuating means.

17. For use with a conveyor track, a device for controlling movement of a trolley along such track comprising a pusher member adapted to overlie such track and mounted for movement from a blocking position to an actuated position, means to engage said pusher member with a trolley whereby said pusher member will prevent normal directional motion of such trolley when in blocking position and impart such motion thereto upon movement of said pusher member to an actuated position, and actuating means for imparting such movement to said pusher member.

18. The invention set forth in claim 17 wherein the said means to engage such pusher member with a trolley prevents movement of such trolley in either direction of travel when said pusher member is in a blocking position.

19. The invention set forth in claim 17 further including means for blocking normal directional motion of a following trolley when said pusher member is in an actuated position.

20. The invention set forth in claim 17 further including means for blocking normal directional motion of a following trolley when said pusher member is in an actuated position, comprising a second pusher member adapted to overlie said track and mounted for movement from a blocking position to an actuated position, means to engage said second pusher member with a trolley whereby said second pusher member will prevent normal directional motion of such trolley when in a blocking position and impart such motion thereto upon movement of said second pusher member to an actuated position, and actuating means for moving said second pusher member to blocking position upon movement of said first pusher member to actuated position and for moving said second pusher member to actuated position upon movement of said first pusher member to blocking position.

ADELBERT J. SCHENK.

REFERENCES CITED

The following references are of record in the file of this patent:

FOREIGN PATENTS

| Number | Country | Date |
|---|---|---|
| 255,780 | Germany | Dec. 31, 1924 |
| 560,449 | Germany | Sept. 15, 1932 |